April 5, 1966  J. HENRY-BAUDOT  3,243,872
ELECTRICAL ROTATING MACHINES
Original Filed Sept. 15, 1958
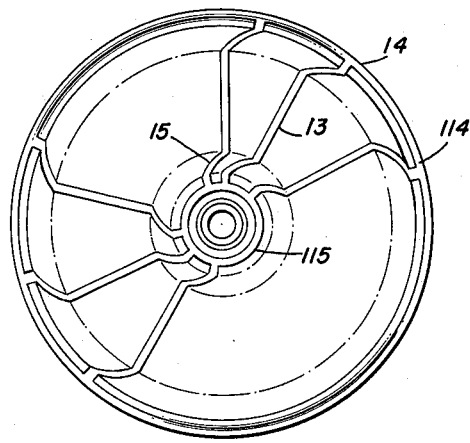
Fig.1.
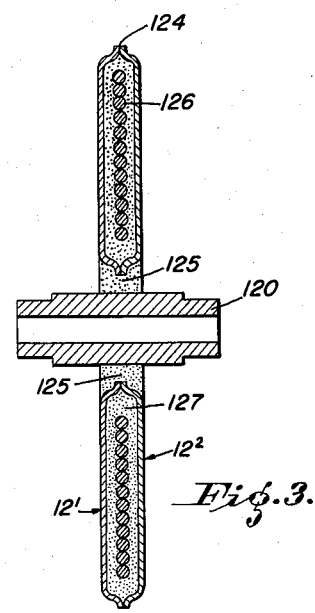
Fig.3.
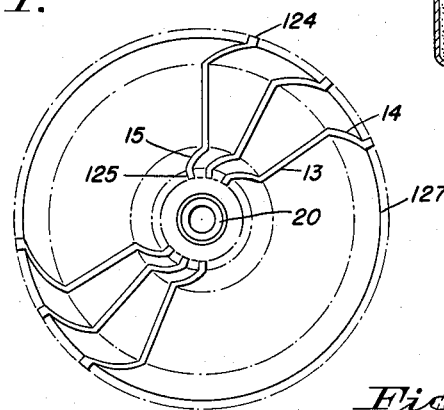
Fig.2.
Fig.4.
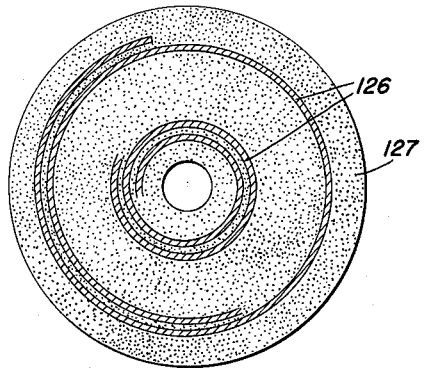
INVENTOR
JACQUES HENRY-BAUDOT
BY
ATTORNEYS United States Patent Office 3,243,872
Patented Apr. 5, 1966

3,243,872
ELECTRICAL ROTATING MACHINES
Jacques Henry-Baudot, Antony, Seine, France, assignor, by mesne assignments, to Printed Motors, Inc., New York, N.Y.,
Original application Sept. 15, 1958, Ser. No. 760,964, now Patent No. 3,165,657, dated Jan. 12, 1965. Divided and this application May 15, 1962, Ser. No. 194,870
Claims priority, application France, Mar. 28, 1958, 761,796
5 Claims. (Cl. 29—155.53)

The present invention concerns improvements in the arrangement of D.C. motors, A.C. generators and rotary converters of the type including a stator member consisting of a plurality of magnetic pole pieces distributed around a substantially flat ring area and a flat rotor consisting of a winding spread out in the form of conductors printed on both sides of a thin dielectric or magnetic supporting disc.

The present application is a division of my copending application Ser. No. 760,964, filed September 15, 1958 (now Patent No. 3,165,657) which was a continuation-in-part of my co-pending application 1,128 filed January 7, 1960 (now Patent No. 3,144,574), which was divided out of earlier filed application Ser. No. 691,434, filed October 21, 1957 (now Patent No. 3,090,880).

While the above mentioned co-pending application is directed mainly to improving electrical rotating machines having a plurality of poles and efficiently operating even at relatively low speeds, I have also found such structures useful in machines of higher speeds up to one thousand r.p.m. and more where the rotor member is adapted to rotate in a magnetic field of relatively high intensity.

In this case, however, the rotor structure of the co-pending application was found to be no longer suitable because the conventional printing techniques delayed and complicated the manufacture of such rotors.

It is therefore an object of the present invention to provide an improved structure, and method of manufacture, for a wound rotor such as disclosed in the co-pending applications but adapted to rotate at higher speed and to operate with higher magnetic flux values.

According to another object of the invention, the rotor winding is divided into two half-windings consisting of cut-out or pre-formed armature conductors which are moulded or embedded in opposite faces of a body of moulded theremosetting dielectric material. The interconnections between the armature conductors on the two faces of the winding may be made either before or after the moulding process, as desired by the manufacturer.

A further object of the invention is to incorporate in the moulded dielectric body a reenforcing member or core, preferably of magnetic material.

These and further objects of the invention will be more fully explained with reference to the accompanying drawings, wherein:

FIG. 1 shows a front view of an armature half winding after it has been cut from a metal sheet and before being subjected to a moulding operation;

FIG. 2 shows a front view of a half-winding unit such as shown in FIG. 1 after the inner and outer rings have been cut off;

FIG. 3 shows in cross section a view of a complete rotor according to the invention in a direction perpendicular to the rotor plane;

FIG. 4 shows in cross section a view of the core of the rotor of FIG. 3 as seen on a central cutting plane normal to the axis of the rotor.

The half winding shown in FIG. 1 is referred to in FIG. 3 as $12^1$ which during assembly of the rotor is connected with a similar half winding $12^2$ on the opposite side of the rotor.

For simplicity's sake only, a small number of armature conductors 13 are shown in each half-winding.

The complete network of armature conductors 13 interconnected by inner and outer conductive rings 114 and 115 may be cut from a conductive metal sheet of suitable thickness of one or more millimeters.

The cutting operation may involve known methods such as stamping, electro-erosion or the like.

The substantially radial portions of conductors 13 are of a length substantially equal to the radial width of the annular airgap in the complete machine.

Outer and inner portions 14 and 15 of each conductor 13 are used to form the end-connections between conductors on opposite faces of the rotor to form an armature winding as explained in the co-pending application Ser. No. 1,128 (now Patent No. 3,144,574). Rings 114 and 115 of each half-winding unit serve to hold conductor portions 13, 14 and 15 in correctly spaced positions until the two units are assembled as explained below and the rings are then cut off and are not used in the final rotor structure.

As indicated in FIG. 3, conductor end portions 14 and 15 on the two half-winding units are bent towards each other and are connected together at their ends in registering pairs, thus connecting conductors on one face to conductors of the other face of the rotor. The connections may be made at the outer and inner peripheries 124 and 125 either by soldering or brazing.

To assemble a rotor, two half-winding units such as shown in FIG. 1, but with end portions 14 and 15 bent out of the plane of conductor portions 13 as described above, are mounted on a provisional or temporary support (not shown) with their curved conductive portions 14 and 15 pointing in opposite directions but with their axes in spatial alignment.

The end-connections between the two half-winding units are then made at the peripheries 124 and 125 and the inner ring 114 is cut away at this time. This forms the two half-winding units into a self-supporting cage structure.

As disclosed in the copending applications mentioned above, the end connections on the two sets of half-turn conductors are arranged at suitable angles to the radial portions so that when registering pairs of terminal portions on opposite sides of the winding unit are connected together, the radial conductors in both sets will all be connected in series circuit relation with alternate conductors located on opposite faces of the rotor winding unit.

As also stated above, the rotor is preferably reenforced by a core 126 inserted between the pre-formed half windings prior to connecting them together as just described.

Core 126 consists of magnetic material, preferably of magnetic wire or ribbon wound into a flat spiral, the beginning and end portions of which are shown in FIG. 4.

The overall thickness of the completed rotor may be of the order of five times the thickness of the conductors of the winding.

Such a winding assembly is placed into a mould and the provisional support is removed. The conductors 13 of the two half-winding units are held in contact with opposite wall faces of the mold, and hub 20 may also be placed in the mold to be molded into proper position. The moulding operation is conventional and, therefore, does not need to be specified. The moulding material is a dielectric of thermosetting and polymerisable resin type such as epoxyvinyl which when polymerized will resist the relatively high temperatures encountered in the operation of electrical rotors.

Alternatively, the half windings may be moulded into opposite faces of the rotor disc before the completion of the end connections and prior to removing inner and outer conductive rings 114 and 115, which may be easily removed or cut-off at a later stage.

In the moulding or casting operation holes are formed in the dielectric material for completing the end-connections between conductors on the two faces after moulding is completed. These connections are made either by metallizing the holes and moulding pieces therethrough or by inserting pieces of wire which are brazed to the conductors.

It is of course possible to use conventional assembly and moulding procedures without departing from the spirit and scope of the invention.

From the foregoing it will be seen that the armature winding is first formed in the shape of a flat toroidal coil, the turns of which enclose a flat annular space. This winding coil differs from the ordinary toroidal coil in that the turns of the coil, instead of being formed in planes substantially parallel with the axis of the coil, are formed in planes which are substantially at right angles to the axis of the coil, that is, substantially parallel with the plane of the coil. The annular space within the coil and the space between turns of the coil are filled with a settable dielectric material which upon hardening forms a supporting core for the coil. Also, as indicated, the dielectric core may have an inner core of magnetic material embedded therein.

I claim:

1. In a method of forming a disc-shaped rotor for an electric machine, the steps of, forming two identical sets of half-turn conductors, each set comprising a plurality of conductors arranged in a flat annular array about a common axis, said conductors being supported from at least one ring member attached to the ends of the conductors at one periphery of said array, the end portions of said conductors which are connected to said ring being arranged at an acute angle with respect to said supporting ring, mounting said two sets of half-turn conductors on a common axis and in spaced parallel relation, connecting the ends of the conductors of one array to the ends of the conductors of the other array to form an annular winding, removing the bridging connections, molding a unitary core of settable dielectric material within the annular space between said two arrays of conductors and within the spaces between the conductors of each array, whereby said dielectric material, upon setting, forms a rigid support of annular form with the conductors of said two arrays embedded in opposite faces thereof.

2. In a method of forming a disc-shaped rotor for an electric machine, the steps of, forming two identical sets of half-turn conductors, each set comprising a plurality of conductors arranged in a flat annular array about a common axis, said conductors being supported from at least one ring member attached to the ends of the conductors at one periphery of said array, the end portions of said conductors which are connected to said ring being arranged at an acute angle with respect to said supporting ring, mounting said two sets of half-turn conductors on a common axis and in spaced parallel relation, molding a unitary core of settable dielectric material within the annular space between said two arrays of conductors and within the spaces between the conductors of each array, whereby said dielectric material, upon setting, forms a rigid support of annular form with the conductors of said two arrays embedded in opposite faces thereof, removing the supporting ring of each array, and connecting the end of the conductors of one array to the ends of the conductors of the other array to connect the conductors of both arrays in series in a circuit to form an annular winding.

3. A method according to claim 1 and including the step of inserting a magnetic core between said two sets of half-turn conductors at the time of assembling them in spaced parallel relation.

4. In a method of forming a disc-shaped rotor for an electric machine, the steps of, forming from sheet metal stock two identical sets of half-turn conductors, each set comprising a plurality of conductors arranged in a flat annular array about a common axis and extending in directions generally radially of said axis, the conductors of each set being held together by integral bridging portions connecting adjacent conductors together, assembling said two sets of half-turn conductors in coaxial relation connecting the ends of the conductors of one array to the ends of the conductors of the other array to connect the conductors in both arrays in series in a circuit to form an annular winding about said common axis, and removing said integral bridging portions.

5. A method according to claim 4 wherein said bridging portions are formed as two rings connecting the ends of the conductors in each array at the inner and outer peripheries of the array.

References Cited by the Examiner

UNITED STATES PATENTS

| | | | |
|---|---|---|---|
| 1,994,534 | 3/1935 | Robinson | 29—155.58 |
| 2,847,589 | 8/1958 | Haydon. | |
| 3,004,325 | 10/1961 | Kornei | 29—155.58 |
| 3,040,213 | 6/1962 | Byer et al. | 29—155.5 |

WHITMORE A. WILTZ, *Primary Examiner.*

JOHN F. CAMPBELL, *Examiner.*

UNITED STATES PATENT OFFICE
CERTIFICATE OF CORRECTION

Patent No. 3,243,872 April 5, 1966

Jacques Henry-Baudot

It is hereby certified that error appears in the above numbered patent requiring correction and that the said Letters Patent should read as corrected below.

Column 4, line 31, after "relation" insert a comma; line 35, after "axis" strike out the comma.

Signed and sealed this 11th day of July 1967.

(SEAL)
Attest:

ERNEST W. SWIDER
Attesting Officer

EDWARD J. BRENNER
Commissioner of Patents